METHOD AND APPARATUS FOR SENSING HANDWRITTEN OR PRINTED CHARACTERS

Filed July 11, 1955 2 Sheets-Sheet 1

INVENTOR.
George P. West

BY [signatures]

his Attorneys

Dec. 13, 1960 G. P. WEST 2,964,734

METHOD AND APPARATUS FOR SENSING HANDWRITTEN OR PRINTED CHARACTERS

Filed July 11, 1955 2 Sheets-Sheet 2

INVENTOR.
George P. West
BY [signature]
[signature]
his Attorneys

United States Patent Office 2,964,734
Patented Dec. 13, 1960

2,964,734

METHOD AND APPARATUS FOR SENSING HANDWRITTEN OR PRINTED CHARACTERS

George P. West, 8719½ Belford Ave., Los Angeles, Calif.

Filed July 11, 1955, Ser. No. 521,184

5 Claims. (Cl. 340—149)

This invention relates to a method and apparatus for sensing handwritten or printed characters and, more particularly, to a device for producing coded input signals for utilization in a data processing system, where the input signals represent indicia or character configuration transcribed onto a data sheet having prearranged guide line sets.

Although the invention is not necessarily so limited, it is generally concerned with the problem of preparing input signals for a data processing machine such as card punching device, electric typewriter, or electronic computer. The problem is one of obtaining a timely translation of original documents into information signals which may be processed, without requiring costly input equipment, skilled personnel, and without involving excessive human error.

Several input data preparation techniques are presently practiced in the art. In many cases the original source documents are translated into handwritten data sheets and then punched cards or tape is prepared through key punching apparatus. This operation is not generally done directly from the original documents because they are often bulky, scattered in various locations, or essential to the continuing operation of the organization.

In many situations, and especially in small calculation operations, the key punching technique involves costs which are the predominate share of the entire data processing operation, including subsequent computation. Part of the cost, of course, exists in the key punching equipment itself, but another part is the cost of a skilled operator to assure efficient and speedy operation of the machine. Yet even with costly punching equipment and a skilled operator, many errors occur in the input conversion process, generally due to human fallibility.

Furthermore, the speed of the punching equipment is somewhat limited in terms of the eventual computing speed which is possible thereafter, no matter how efficient the operator. And the time consumed in initially transribing the original documents is wasted time considering the overall operation.

The time and cost problems inherent in the preparation of input data are especially difficult where small computation problems are involved or where little data is required. In this situation it is not economical for a party desiring the computation to perform the key punching at his location, and this step therefore must be delegated to others specializing in the punching operation. This means, of course, that it is generally not economical for the party having a small problem to seek the services of the high-speed computer specialists, simply due to the difficulty in transcribing his information into machine language.

Several solutions have previously been proposed for this problem, some of which are presently in practice to a limited extent. One approach has been to utilize mark-sensing recording where the original data is translated into machine language by marking a card with conducting pencil or ink. Typically, this may be performed on the so-called "IBM" card where the coding is made in the Hollerith code.

The mark-sensing technique allows the operator to present information directly to a computing machine without the intermediate and costly key punching operation but involves a very time consuming and tedious operation which is easily subject to error.

Another approach has been to devise an automatic punching machine which is designed to sense original data without further translation, provided this data is printed in the form of characters having a prescribed pattern. A machine of this type is found in Patent 2,063,481 to J. W. Bryce for "Perforating Machine."

The Bryce device is arranged to sense a plurality of points in the field of a printed character by means of a corresponding plurality of light reactive elements, such as photocells. The arrangement operates quite satisfactorily if the characters are made to accurately conform to the sensing pattern, but is disadvantageous in the requirement of fairly complicated means for translating light reflections into the desired code.

The general technique of utilizing the so-called "energy reflective" property of printed material as a means for obtaining signals for direct translation into a predetermined code is also employed in other systems such as those shown in the patents to V. K. Zworykin et al. and L. E. Flory Nos. 2,616,983 and 2,615,992, both entitled "Apparatus for Indicia Recognition."

The Zworykin and Flory devices also require a predetermined printing pattern and are typified by a circuit complexity which is partially due to the special requirements for a serial pulse translation and to the equipment for translating the predetermined code into sound.

The limited function of these machines is apparent in that no provision is made for handwritten character interpretation or for translating print which is not made in accordance with the strict requirements of the coding scheme. Thus subsequent attempts have been made to allow for character variations, as for example is illustrated in the patent to C. J. Fitch No. 2,682,043 for "Character Sensing and Analyzing System". It is interesting to note, in this connection, what is said in the second paragraph of column 1 in this patent reading as follows: ". . . In general, however, such prior devices have depended for their operation upon the use of some common characteristic in specially shaped characters or code marks or on uniform printing density of the character and the like on the original document."

The Fitch disclosure also exemplifies the circuit complexity which results from the utilization of phtotocells for character translation; twenty photocells and associated amplifiers and relays being required for initial reading signals before any character analysis is performed. The real complexity, however, is noted in the means for recognizing differently formed characters having a wide range of variations.

It will be noted that the Fitch description relates to the switching circuits required to sense the allowable variations for just one character, namely the digit "2." And yet the scheme proposed therein requires a first relay matrix of ten banks and a considerable number of associated contacts, a neon lamp matrix for allowing sensing variations to detect differently formed "2's," and an output matrix including ten banks and a second complexity of contacts.

The reason for this extreme complexity merely for the detection of just one digit is that the solution proposed is actually just "brute force" without any logical analysis of the real character variation problem which exists. Furthermore, the approach is not realistic because the proper detection of one digit and the code translation thereof does not insure that all characters in the group, as for example, just the digits 0 through 9, may be properly distinguished.

The present invention obviates the above and other disadvantages inherent in the prior art techniques of input data preparation from written or printed characters by providing a method and related apparatus where the various characters are transcribed onto a pre-ruled data sheet with certain guide line sets, the writing or printing being made with a substance designed to vary an electrical characteristic such as current conductance, flux permeability, or capacitive charge.

The characters thus transcribed are read by means of a sensing device or reading head which includes a subgroup of sensing elements or electrodes which are arranged to detect a predetermined condition in the character configuration sensed, in terms of electrical characteristic variations.

The essence of the invention lies in the technique of arranging the electrodes of each sensing subgroup, which may be considered to be a testing group, so that a set of distinguishing characteristics is defined which allow considerable character configuration variation, within the preselected guide line pattern, without introducing any analysis error.

The signals derived through each subgroup sensing electrode set are then combined in respective logical translation circuits which produce corresponding test or interpreting signals indicating the character line condition at the various subgroup areas.

A single subgroup electrode set may be employed in the reading head provided by the invention if provision is made for repositioning this head over successive guide line areas where characters are written or printed. This may be termed a serial operation. However, the electrode printing technique taught by the invention is so simple that it is believed advantageous for most applications that a group of electrode subgroup sets be employed, one such set for each character position on the data sheet utilized. In this manner an effective parallel translation may be effected, although the actual utilization may be serial, as for example can be accomplished through a step-actuated sensing arrangement to be described.

In the particular description which follows the technique of the invention is illustrated for the sensing of the digits 0 through 9, where four testing subgroups of electrodes are provided. A sensing head is provided then which has a plurality of electrode groups where three of the four groups are illustrated as including three electrodes each, and the fourth as including two electrodes although other arrangements are suitable. As a typical example of the sensing logic which may be employed the three three-electrode groups sense a line continuity condition as an "and" function. The "and" testing function is not satisfied unless all of the electrodes are crossed by the conducting ink character configuration. The fourth group includes only two electrodes arranged to sense certain line extremities as described below.

As an example of a set of distinguishing tests a first signal $T^1$ is produced indicating a digit line in an upper left hand sector for the digits 0, 5, 6, 8 and 9. A second test is performed to produce the signal $T^2$ indicating the presence of a line in an upper right sector for the digits 0, 2, 3, 7, 8 and 9. The third test provides a signal $T^3$ indicating a digit line in a lower center or lower left sector for the digits 0, 1, 2, 4, 6, 7, and 8; and a fourth test results in a signal $T^4$ indicating a digit line for the digits 0, 1 and 7.

The fourth test is somewhat more complicated than the others in that the logical "and" and "or" function is performed where the test is positive (represented herein as a binary 1) when a center electrode is crossed as in the case of 1 and 7 and a lower right hand corner electrode is not crossed, or when the center electrode is not crossed as in the case of 0 and the lower right hand electrode is crossed. In any case where the center and lower right hand corner electrodes are crossed or where neither electrode is crossed a negative signal is produced (considered as binary 0 herein). Thus the digit 8 provides a negative test or 0 signal since both the center electrode and the lower right hand corner electrode are crossed.

The technique of direct electrode sensing according to the invention obviates the necessity of the complex circuit arrangement dictated by the photocell technique of the prior art. In practice the sensing heads may be constructed in accordance with the principle of the invention by utilizing well-known printed circuit techniques where the various sensing electrode groups are etched metal strips and output terminals may be provided through punched holes made through the printed circuit board, constituting the face of the sensing head.

The logical translation function which is required may be mechanized quite simply since in a particular example given only three "and" circuits are required and one combination "and" and "or." Since the sensing operation may be performed at a relatively low rate compared to the computing operation to follow, relay logical switching circuits are suggested herein as being suitable. It will be understood, of course, that where high speed switching logic is desired the diode matrix or other logical electronic matrices may be preferred.

The logical sensing or testing signals then are readily transformed into the desired computer code through a translation matrix, a typical type being illustrated herein although such matrices are well known in the art.

In this manner then a sensing technique is provided wherein a minimum of logical switching circuits are required and yet a considerable amount of character variation is permissible. The improvement of the logic which results can readily be noted by making a comparison between the logical switching circuits of the present description and that found in the Fitch patent mentioned above. This simplicity is especially noteworthy due to the fact that the Fitch disclosure contemplates only the sensing of one digit, and the switching logic therein has to be duplicated in order to allow the sensing of more digits.

Accordingly, it is an object of the present invention to provide a method of character translation into electrical signal sets where the system complexity of a typical prior art photocell arrangement is obviated.

Another object is to provide a method of data sheet preparation and interpretation allowing writing or printing variations within prespecified boundaries without interpretation error.

A further object is to provide a reading head which may be employed in a data processing system to sense characters in a predetermined group, the characters being transcribed by writing or printing by means of a substance designed to vary an electrical characteristic, the reading head being designed for use with a plurality of logical sensing elements.

Still another object of the invention is to provide a reading device comprising a plurality of electrode sets arranged to check the conducting character line condition of a group of characters transcribed onto a data sheet with guide line sets, the device allowing a simple logical sensing of the character configuration group.

A more specific object of the invention is to provide a system for translating decimal digits which are written or printed by means of a conducting material onto a data sheet having a plurality of guide line groups, the system including a sensing device having at least four sets of electrodes to perform four digit line tests.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figures 1, 3:
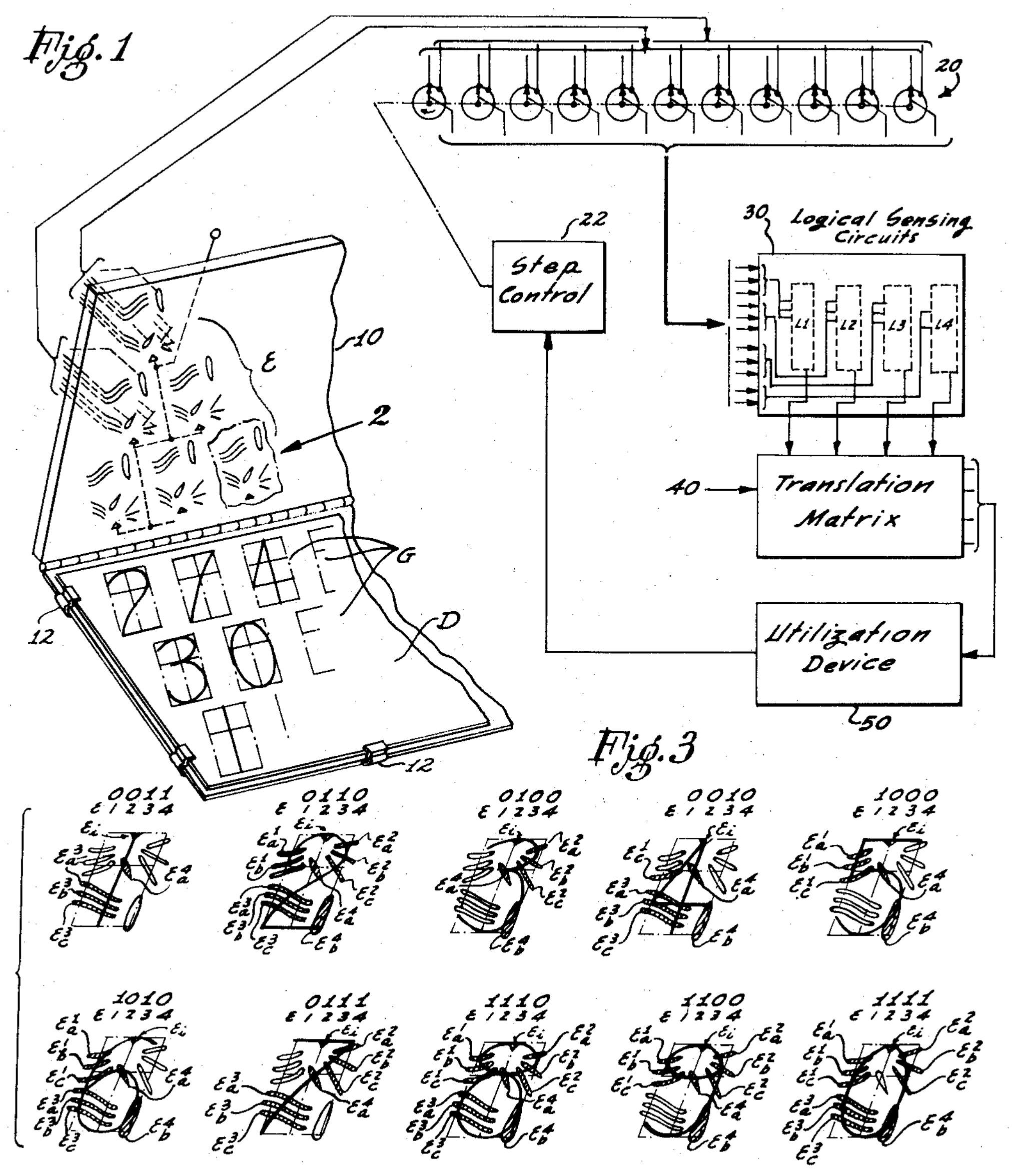
Fig. 1 is a block diagram of a system employing the present invention.
Fig. 3 illustrates the manner in which a typical character configuration group may be sensed in accordance with the logical arrangement of electrode subgroups in accordance with the invention.

Reference is now made to Fig. 1 wherein the general arrangement of a system employing the present invention is shown. As indicated in Fig. 1 the characters to be sensed are transcribed onto a data sheet D which has thereon a plurality of guide line sets G. The characters belong to a predetermined group such as is illustrated in Fig. 3 and are sensed through a reading head 10 which includes a plurality of subgroup electrode sets E, there being one electrode set E for each of the character guide line sets G.

The data sheet D is positioned by suitable means so that each corresponding electrode set E becomes directly associated with a guide line set on the data sheet when reading head 10 is closed upon the data sheet. As an illustration paper guide means 12 are shown although other devices may be employed.

Along with the various sensing electrodes each set E also includes an input electrode E*i* which receives a suitable reference signal such as a positive potential where the electrodes are designed to provide a current conduction path. It will be understood, of course, that the term "electrode" as employed herein is intended to indicate the electrical terminal for any of the various electrical characteristic variations which may be sensed. Thus it is intended that the plates of a capacitive sensing device be considered to be electrode and, in the same manner, that the flux path or air gap sensing device be considered also as electrode.

The output signals derived through sensing head 10 are then applied to a step actuated switching device 20 which is arranged so that step control signals received through a device 22 may position device 20 so that the corresponding set of output signals from an electrode group are applied to a set of logical sensing circuits 30, including circuits L1, L2, L3 and L4 as a particular illustration.

Logical sensing circuits 30 are operative to translate the various sets of electrode signals into corresponding output testing signals which are then applied to a translation matrix 40 providing output signals applied to a utilization device 50, typically being an electronic computer. A sequencing signal is obtained through device 50 indicating when the next character is to be read and this signal then actuates step control device 22 to provide the signal controlling switching device 20. In this manner then successive characters may be read from data sheet D and translated into corresponding digital input signals for device 50.

It will be understood, of course, that a single electrode group E may be employed instead of a multitude of groups corresponding to the number of digit positions on data sheet D, if provision is made for repositioning the head over successive character guide lines set in accordance with the sequencing signal produced by device 50. While this arrangement requires fewer electrode sets, it involves an extra problem of registration. Consequently, the multiple electrode group arrangement shown in Fig. 1 is generally preferred although the invention is not so limited.

The logical approach of the invention is best understood by considering a specific character group, namely the digits 0 through 9, and the manner in which these digits may be detected by the proper arrangement of electrode subgroups.

In accordance with the specific technique employed for the digit sensing, four testing groups are provided providing logical testing signal sets $T_a^1$, $T_b^1$, $T_c^1$; $T_a^2$, $T_b^2$, $T_c^2$; $T_a^3$, $T_b^3$, $T_c^3$; and $T_a^4$, $T_b^4$. The electrodes are shown lightly in Fig. 3 when the character to be sensed does not pass therethrough and in heavy line when they are operative to sense an electrical characteristic variation due to the presence of the line.

Thus electrodes $E_a^1$ and $E_b^1$ are shown as dark lines under the digit 2 since in the upper left hand sector of the guide line set a line portion of the two crosses these two electrodes. In a similar manner the electrodes $E_a^2$, $E_b^2$ and $E_c^2$ are shown in heavy line under the character 2 since all of these electrodes are crossed in the upper right hand sector of the guide line set.

Each electrode subgroup is arranged to detect a predetermined distinguishing line condition. Thus the set $E_a^1$, $E_b^1$ and $E_c^1$ is positioned so as to sense a line continuity condition in the upper left hand sector of the guide line set. A testing signal $T^1$ is then defined which is positive or binary 1 when the character line passes through all three electrode positions. This will be referred to herein as an "and" condition and is represented by the function $T^1=T_a^1.T_b^1.T_c^1$, where signals $T_a^1$, $T_b^1$ and $T_c^1$ are derived through electrodes $E_a^1$, $E_b^1$ and $E_c^1$, respectively.

Thus it will be noted that the digits 1, 2, 3, 4 and 7 are sensed as a negative test $T^1$, also indicated in Fig. 3 by the respective code sets under the corresponding guide line position, and the digits 5, 6, 8, 9 and 0 all have a continuous line portion passing through these three electrodes so that the "and" function test $T^1$ is satisfied in all of these cases.

It is important to note that a considerable variation in character line configuration is permissible before any of the line positions tested for would cause a variation in the test result. Thus the number 1 would have to vary considerably off the center portion of the guide line set before it would cross all three of the electrodes $E_a^1$, $E_b^1$ and $E_c^1$. And in a similar manner the line of the number 5 passing through these electrodes would have to vary considerably to fail to pass therethrough.

The most sensitive lines in the upper left sector which must be detected are those in the digits 8 and 9 so that the electrodes therein are extended upward in an arc-like variation.

In a similar manner the electrode set $E_a^2$, $E_b^2$ and $E_c^2$ is positioned to detect the character line continuity in the upper right hand sector of the guide line set with considerable variation in the line being permissible before any error would occur. This second test then may be defined as the logical function $T^2=T_a^2.T_b^2.T_c^2$.

The second test resulting in signal $T^2$ then provides another division in the digit group 1, 2, 3, 4, 7 where the test is negative for digits 1 and 4 and positive for digits 2, 3 and 7. The same test also makes a division in the group 5, 6, 8, 9, 0 between the digits 5 and 6 which are negative and the digits 8, 9 and 0 which are positive.

The third test is arranged to provide a signal $T^3$ defined as a function: $T^3=T_a^3.T_b^3.T_c^3$ which detects a line continuity condition in the lower left hand corner of the guide line set. And the fourth test may be considered to be a line extremity test since it detects the presence of the tail end of the digit 2 so that it may be distinguished from the digit 7 and the tail end of the cross line of the digit 4 so that it may be distinguished from the digit 1. This test then is defined in the combined "and" and "or" function as follows: $T^4=T_a^4.\bar{T}_b^4+\bar{T}_a^4.T_b^4$; where the bar (—) indicates the absence of a signal.

The following table indicates the logic of the distinguishing test where the binary representation is arranged in a weighted sequence to show how the various tests provide the sensing separation.

*Table I*

| | $T^1$ | $T^2$ | $T^3$ | $T^4$ |
|---|---|---|---|---|
| (4)----- | 0 | 0 | 1 | 0 |
| (1)----- | 0 | 0 | 1 | 1 |
| (3)----- | 0 | 1 | 0 | 0 |
| (2)----- | 0 | 1 | 1 | 0 |
| (7)----- | 0 | 1 | 1 | 1 |
| (5)----- | 1 | 0 | 0 | 0 |
| (6)----- | 1 | 0 | 1 | 0 |
| (9)----- | 1 | 1 | 0 | 0 |
| (8)----- | 1 | 1 | 1 | 0 |
| (0)----- | 1 | 1 | 1 | 1 |

From Table I it may be readily determined that the four logical sensing tests are sufficient to provide a distinguishing pattern for all ten digits. It should be apparent to those familiar with binary numbers that this four test sensing, where each test has only two possibilities, is the simplest possible for distinguishing ten decimal digits. It will be understood, of course, that where further reliability in sensing is desired, allowing a greater freedom in writing, more tests may be performed. Furthermore, it is contemplated in accordance with the teaching of the invention, that both numbers and letters may be sensed thereby, as for example by employing six or more sensing electrode groups which also results in additional redundancy in the numerical test.

Figure 4:
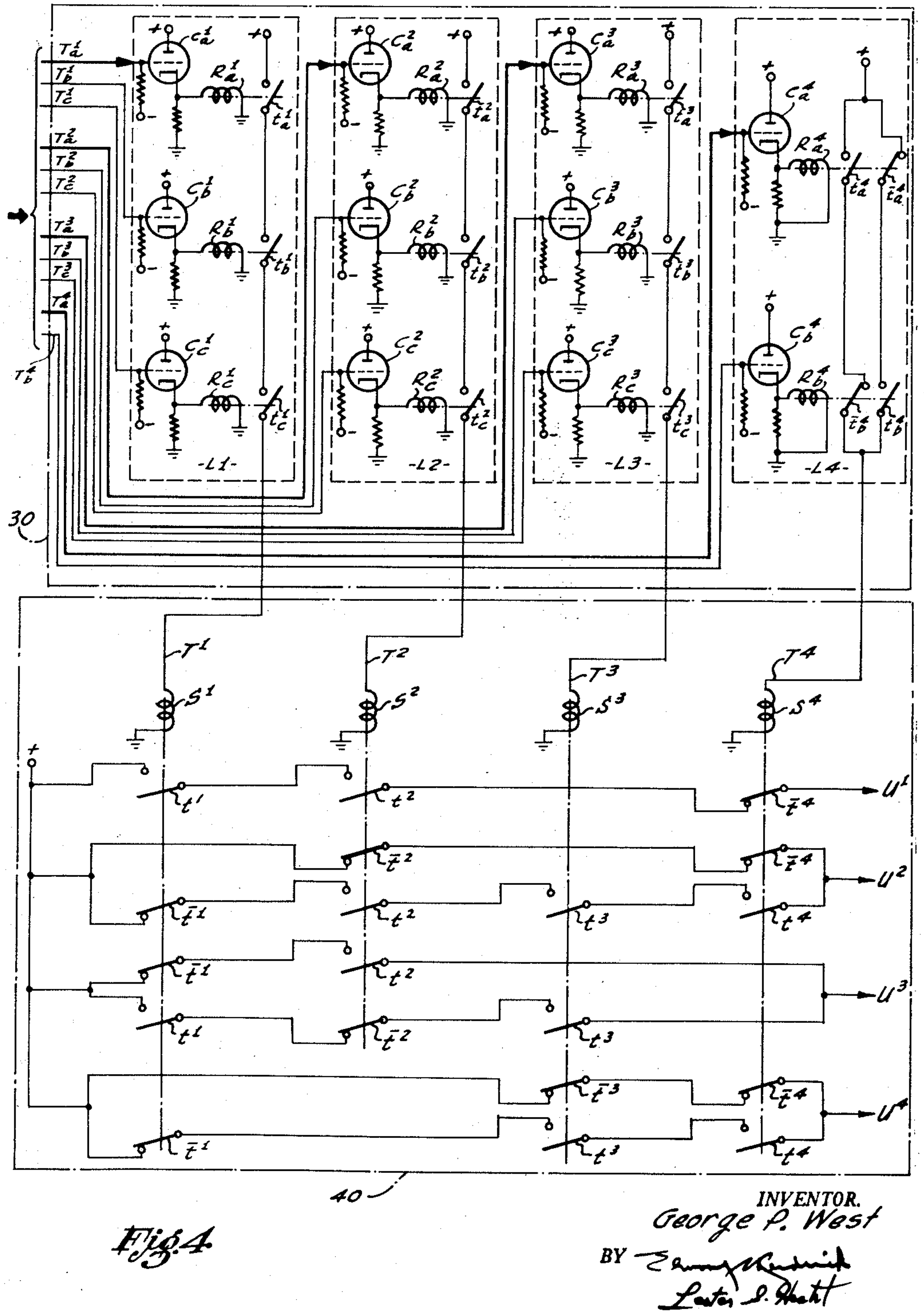
Fig. 4 illustrates a particular schematic arrangement for logical sensing circuit 30 and translation matrix 40.

A suitable switching arrangement for translating the electrical character signals provided by electrodes E is illustrated in Fig. 4. As indicated in Fig. 4, each testing signal $T_a^1$, $T_b^1$, etc. . . . is applied to a cathode follower stage such as stage $C_a^1$ which receives signal $T_a^1$, and the cathode follower then provides actuating current for an associated relay winding such as winding $R_a^1$ connected to the cathode load resistor of stage $C_a^1$.

The testing signals then are provided in accordance with the logic discussed above through the proper arrangement of the relay contacts associated with the various solenoids. Thus in this manner testing signal $T^1$ provides actuating current for an output solenoid $S^1$ when all of the contacts associated with the relay windings $R_a^1$, $R_b^1$ and $R_c^1$ are closed. This provides the "and" function $T^1=T_a^1.T_b^1.T_c^1$.

In a similar manner the testing signals $T^2$ and $T^3$ actuate corresponding solenoids $S^2$ and $S^3$ only when all of the relay contacts associated therewith are closed. The fourth testing signal derived through logical testing circuit L4 requires the inclusion of two transfer elements in association with each of the relay windings $R_a^4$ and $R_b^4$. These elements are referenced as $t_a^4$, $\bar{t}_a^4$ and $t_b^4$, $\bar{t}_b^4$. The bar (—) is utilized to indicate that the transfer element is normally closed and that the actuation of the associated solenoid causes it to open; whereas the reference characteristic without the bar signifies a transfer element which is normally open and is closed by the solenoid action.

In this manner, then the signal $T^4$ is present actuating solenoid $S^4$ whenever relay $R_a^4$ is actuated, transferring element $t_a^4$, and relay $R_b^4$ is not actuated leaving element $\bar{t}_b^4$ in its normally closed position; or provides actuating current when relay $R_a^4$ is not actuated, leaving transfer element $\bar{t}_a^4$ in its normally closed position and relay $R_b^4$ is actuated closing transfer element $t_b^4$.

The signals $T^1$, $T^2$, $T^3$ and $T^4$ are then converted through translation matrix 40 to provide the coded output signals for utilization. For convenience these signals are referenced herein as signals $U^1$, $U^2$, $U^3$ and $U^4$ and are given conventional binary weights of 8, 4, 2 and 1, respectively. The translation function which must be performed by matrix 40 is indicated in Table II as follows:

*Table II*

| | $T^1$ | $T^2$ | $T^3$ | $T^4$ | $U^1$ | $U^2$ | $U^3$ | $U^4$ |
|---|---|---|---|---|---|---|---|---|
| (0)- | 1 | 1 | 1 | 1 | 0 | 0 | 0 | 0 |
| (1)- | 0 | 0 | 1 | 1 | 0 | 0 | 0 | 1 |
| (2)- | 0 | 1 | 1 | 0 | 0 | 0 | 1 | 0 |
| (3)- | 0 | 1 | 0 | 0 | 0 | 0 | 1 | 1 |
| (4)- | 0 | 0 | 1 | 0 | 0 | 1 | 0 | 0 |
| (5)- | 1 | 0 | 0 | 0 | 0 | 1 | 0 | 1 |
| (6)- | 1 | 0 | 1 | 0 | 0 | 1 | 1 | 0 |
| (7)- | 0 | 1 | 1 | 1 | 0 | 1 | 1 | 1 |
| (8)- | 1 | 1 | 1 | 0 | 1 | 0 | 0 | 0 |
| (9)- | 1 | 1 | 0 | 0 | 1 | 0 | 0 | 1 |

From Table II it is possible to define the logical translation functions as follows:

$$U^1=T^1.T^2.\bar{T}^4$$
$$U^2=\bar{T}^2.\bar{T}^4+\bar{T}^1.T^2.T^3.T^4$$
$$U^3=\bar{T}^1.T^2+T^1.\bar{T}^2.T^3$$
$$U^4=\bar{T}^3.\bar{T}^4+\bar{T}^1.T^3.T^4$$

The manner in which the relay switching function is then performed in accordance with these translation functions should be readily understood from the previous examples and therefore will not be discussed any further herein.

It will be understood that the particular logical switching technique which is illustrated in Fig. 4 and the translation function shown therein are not important aspects of the invention since the essence of the invention resides rather in the logical sensing technique. Furthermore, it should be appreciated that a multitude of other arrangements for logical sensing and translation are possible.

Figure 2:
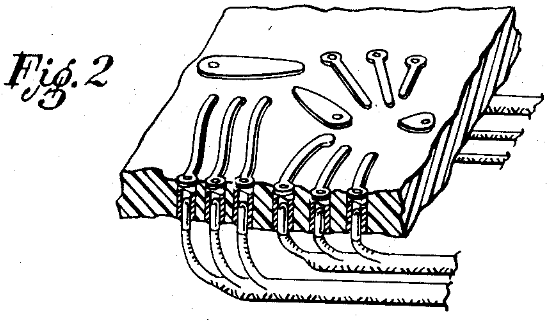
Fig. 2 is an expanded view of the section of the reading head of Fig. 1 showing printed electrode elements thereon.

Reference is now made to Fig. 2 which shows an expanded portion of sensing head 10 illustrating in further detail a suitable arrangement of electrodes E obtained through well-known printing circuit techniques.

As indicated in Fig. 2 provision is made for passing the end of each etched electrode strip through the sensing head board with a hole therethrough allowing the insertion of a tapered wire terminal.

Thus it will be noted that electrode $E_b^4$ has a terminal end which passes through head board 10 and is adapted to receive a tapered wire terminal $W_b^4$. In a similar manner then each of the electrodes is printed on the face of sensing head 10 and is arranged to provide a conducting wire path through the head, the output signal provided thereby being then picked up through the tapered wire terminal associated therewith.

From the foregoing description it should now be apparent that the present invention provides a method and apparatus for sensing handwritten or printed characters to provide character sensing signals which may be translated into input signals for a data processing machine.

The method taught herein is the essence of simplicity and yet allows a considerable character variation, within predetermined guide line boundaries established on the data sheet.

It should also be appreciated that an important feature of the invention is the utilization of electrical characteristic variation as a direct means of indicating the line condition of the various characters. This technique obviates the necessity of complicated light reflection apparatus which has always been beset with difficulty in accurately registering the light information so as to properly represent the character configuration.

The description herein has been particularly directed to the sensing and translation of decimal digits. However, it will be apparent to those skilled in the art that the technique is applicable as well to the translation of letters, or any other symbol which may be written or printed within predetermined guide line sets.

A particular arrangement for translating the sensed signals has been shown. It will be recognized, however, that the variations which are possible are almost infinite in terms of the type of character configurations involved as well as the particular rules which are specified as to how the various characters must fall within the guide line sets. Furthermore, a considerable amount of freedom is allowed in the design parameter specifying the type of switching elements which are employed.

Accordingly, it will be recognized that the essence of the invention resides only in the utilization of a sensing device with a plurality of electrode subgroups arranged to detect a predetermined condition in the character configuration which is sensed in terms of its electrical characteristic variations. It is expected that those skilled in the art will be readily able to devise a multitude of useful variations in embodiments of the present invention from this disclosure.

What is claimed is:

1. A system for translating decimal digits, written or printed by means of a conducting material on to a data sheet having a plurality of guide line groups, into a corresponding group of coded output signals including at least four signals $U^1$, $U^2$, $U^3$ and $U^4$, said system comprising: a sensing device including at least one reading head, said reading head including at least four sets of electrodes arranged to perform four digit line tests; means including logical gating circuits coupled to said sets of electrodes, respectively, for producing testing signals $T^1$, $T^2$, $T^3$ and $T^4$, each testing signal being logically defined for the particular corresponding line test; and output means for translating said signals $T^1$, $T^2$, $T^3$ and $T^4$ into said output signals $U^1$, $U^2$, $U^3$ and $U^4$; the first test resulting in signal $T^1$ indicating a digit line in a first sector for the digits 0, 5, 6, 8 and 9; the second test resulting in signal $T^2$ indicating a digit line in a second sector for the digits 0, 2, 3, 7, 8, 9; the third test resulting in signal $T^3$ indicating a digit line in a third sector for the digits 0, 1, 2, 4, 6, 7, 8, 9; and the fourth test resulting in signal $T^4$ indicating a digit line for a fourth sector and the digits 0, 1 and 7; said signals $T^1$, $T^2$, $T^3$, $T^4$ being defined in accordance with the ligical testing functions:

$$T^1=T_a^1.T_b^1.T_c^1$$
$$T^2=T_a^2.T_b^2.T_c^2$$
$$T^3=T_a^3.T_b^3.T_c^3$$
$$T^4=T_a^4.T_b^4+T_a^4.T_b^4$$

where the dot (.) represents the logical "and"; the plus (+) the logical inclusive "or", the bar (—) over a signal indicating a complementary signal; and the subscripts *a*, *b* and *c* indicating the electrode signals in the corresponding set.

2. In a data processing system utilizing sets of output signals representing respective characters in a predetermined group, said characters being portrayed as combinations of line elements, a device responsive to physical representations of any selected character for producing corresponding output signals, said device comprising: sensing apparatus including means defining at least four spaced apart sensing areas, each of said sensing areas having a plurality of sensing elements, a first of said sensing areas being common to all of said characters, the remainder of said sensing areas having a first elongated dimension approximately parallel to the line elements in said areas and defined by the totality of sensing elements associated with each of said areas, said sensing areas having a linear elongated shape defined by the length of said sensing elements, intersecting linear portions of some characters approximately perpendicularly to the curvature of said sensing elements of said remaining sensing areas at the expective point of intersection of each with said portions of some characters being perpendicular to the tangent of said portions, the curvature of said sensing elements being matched to the expected probable curvature of said portions of some characters, said expected curvature of said portions of some characters being based on statistical probability of the curvature of said portions for a particular position thereof, means for maintaining said sensing areas in fixed positions relative to that of a character representation being sensed, said remaining sensing areas being maintained in respective positions corresponding to those different portions of some characters; means including logical gating circuits producing output signals only when said line elements of said characters intercept all of said sensing elements of a given one of said sensing areas and logical sensing circuits responsive to said output signals to produce character recognition signals identifying the character being sensed, said sensing areas having a shape to conform to predetermined allowable variations in the size and shape of all of said respective portions of said characters and thereby to permit sensing of said characters having said predetermined allowable variations.

3. In a data processing system utilizing sets of output signals representing respective characters in a predetermined group, a device responsive to linear representations of any selected character distinguishable on a physical surface for producing corresponding output signals, said device comprising: sensing apparatus including means defining a first sensing area common to a portion of all of said characters, and a plurality of further sensing areas, said sensing areas each having a plurality of sensing elements extending across spaced linear portions of some characters, the shape of said sensing areas conforming to that of said physical surface, said groups of sensing areas being maintained in respective positions corresponding to at least two different portions of some characters; logical gating circuits to produce signals to indicate that all of the sensing elements in any one of said sensing areas extend across a corresponding portion of a character; and means responsive to said indicating signals for identifying a character being sensed, said sensing areas having a shape to conform to predetermined allowable variations in the size and shape of all of the characters and thereby to permit sensing of characters having said predetermined allowable variations, all of the sensing elements in each of said sensing areas being spaced apart to permit accurate production of said indicating signals, said groups of sensing areas being spaced apart to permit logical identification of said character being sensed.

4. A character recognition system for differentiating between characters each having various essential line elements of minimum length and approximate positions in various of five distinct regions, the line elements of the characters being formed by a material capable of varying an electric signal, said character recognition system comprising a reading head having five character sensing regions defined thereon and corresponding to the five regions in which line elements of a character may appear, a first plurality of line sensing elements for sensing the extent of a line element in one of said regions along the left edge of the character from about the vertical middle of the character through at least its upper third, a second plurality of line sensing elements for sensing the extent of line elements in a second of said regions along the right edge of the character from about its vertical middle through at least its upper third, a third plurality of line sensing elements for sensing the extent of line elements in a third of said regions in the left half of said character in a middle region of the lower vertical half of said character, a first single line sensing element for sensing the presence of a line element in a fourth of said regions in the middle region of said character, a second single line sensing element for sensing the presence of a line element in a fifth of said regions at the lower right of the character, and means for producing a coded output signal indicative of said character, said means including first gate means for producing a first output signal only when a line element engages all of said first plurality of sensing elements, second gate means producing a second output signal when a line element engages all of said second plurality of sensing elements, third gate means producing a third output signal only when a line element engages all of said third plurality of sensing elements, and fourth gate means for producing an output signal when only one of said first and second single line sensing elements detects a line element.

5. The combination according to claim 4 further comprising a common electrode arranged in a region to be contacted by one line element of each of said characters.

References Cited in the file of this patent

UNITED STATES PATENTS

| | | |
|---|---|---|
| 2,198,248 | Hansell | Apr. 23, 1940 |
| 2,598,937 | Parker | June 3, 1952 |
| 2,615,992 | Flory | Oct. 28, 1952 |
| 2,616,983 | Zworykin | Nov. 4, 1952 |
| 2,690,222 | Wilson | Sept. 28, 1954 |
| 2,723,308 | Vroom | Nov. 8, 1955 |
| 2,741,312 | Johnson | Apr. 10, 1956 |